US012260166B2

(12) United States Patent
Peck et al.

(10) Patent No.: US 12,260,166 B2
(45) Date of Patent: Mar. 25, 2025

(54) SYSTEM FOR GENERATING OUTLINE NAVIGATIONAL INTERFACE FOR NATIVE MOBILE BROWSER APPLICATIONS

(71) Applicants: Atlassian Pty Ltd., Sydney (AU); Atlassian US, Inc., San Francisco, CA (US)

(72) Inventors: Ryan Peck, Austin, TX (US); Prabal Saha, Mountain View, CA (US); Alexander Decker, Mountain View, CA (US); Phillip Aaronson, Mountain View, CA (US); Rylee Frazier, Mountain View, CA (US); David Akinyemi, Mountain View, CA (US); Stephanie Zhang, Redwood City, CA (US); Natalia Baryshnikova, San Francisco, CA (US); Michael Cannon-Brookes, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/126,223

(22) Filed: Mar. 24, 2023

(65) Prior Publication Data

US 2023/0306187 A1 Sep. 28, 2023

Related U.S. Application Data

(63) Continuation of application No. 17/710,577, filed on Mar. 31, 2022, now Pat. No. 11,615,231.
(Continued)

(51) Int. Cl.
*G06F 17/00* (2019.01)
*G06F 16/335* (2019.01)
(Continued)

(52) U.S. Cl.
CPC .......... *G06F 40/109* (2020.01); *G06F 16/335* (2019.01); *G06F 40/106* (2020.01);
(Continued)

(58) Field of Classification Search
CPC .... G06F 40/109; G06F 16/335; G06F 40/137; G06F 40/205; G06F 40/106
See application file for complete search history.

(56) References Cited

U.S. PATENT DOCUMENTS 5,978,818 A 11/1999 Lin et al.
8,600,942 B2 12/2013 Wright et al.
(Continued)

*Primary Examiner* — Mohammed H Zuberi
(74) *Attorney, Agent, or Firm* — Brownstein Hyatt Farber Schreck, LLP

(57) ABSTRACT

A method includes receiving a document for displaying on a display of the client device. The method includes identifying a first portion and a second portion of the document having a first level of content hierarchy, and determining a first text corresponding to the first portion and a second text corresponding to the second portion of the document. The method includes generating a first outline entry including the first text and a second outline entry including the second text, and displaying a selectable entry point on a graphical user interface. The method includes, in response to a selection of the selectable entry point, displaying an outline window, including the first outline entry and the second outline entry, and navigating to the first portion of the received document or the second portion of the document in response to a selection of the first outline entry or the second outline entry.

20 Claims, 14 Drawing Sheets

Related U.S. Application Data

(60) Provisional application No. 63/310,536, filed on Feb. 15, 2022.

(51) Int. Cl.
*G06F 40/106* (2020.01)
*G06F 40/109* (2020.01)
*G06F 40/137* (2020.01)
*G06F 40/205* (2020.01)
*G06N 20/00* (2019.01)

(52) U.S. Cl.
CPC .......... *G06F 40/137* (2020.01); *G06F 40/205* (2020.01); *G06N 20/00* (2019.01)

(56) References Cited

U.S. PATENT DOCUMENTS

| | | | |
|---|---|---|---|
| 8,745,506 B2* | 6/2014 | Choudhary | G06F 9/451 |
| | | | 715/739 |
| 10,650,185 B2* | 5/2020 | Wen | G06F 16/94 |
| 2008/0244381 A1* | 10/2008 | Nicolaou | H04L 67/04 |
| | | | 707/E17.121 |
| 2011/0082913 A1 | 4/2011 | Beykpour et al. | |
| 2011/0209056 A1* | 8/2011 | Choudhary | G06F 9/451 |
| | | | 715/702 |
| 2014/0281906 A1* | 9/2014 | Burckart | G06F 16/9577 |
| | | | 715/234 |
| 2018/0048464 A1 | 2/2018 | Lim et al. | |
| 2020/0042579 A1* | 2/2020 | Ben-Ishay | G06F 40/166 |
| 2021/0216595 A1 | 7/2021 | Walia et al. | |
| 2022/0083724 A1 | 3/2022 | Li et al. | |
| 2022/0092097 A1 | 3/2022 | Gupta et al. | |

* cited by examiner

SYSTEM FOR GENERATING OUTLINE NAVIGATIONAL INTERFACE FOR NATIVE MOBILE BROWSER APPLICATIONS

CROSS-REFERENCE TO RELATED APPLICATION(S)

This application is a continuation patent application of U.S. patent application Ser. No. 17/710,577, filed Mar. 31, 2022 and titled "System for Generating Outline Navigational Interface for Native Mobile Browser Applications," which is a nonprovisional patent application of and claims the benefit of U.S. Provisional Patent Application No. 63/310,536, filed Feb. 15, 2022 and titled "System for Generating Outline Navigational Interface for Native Mobile Browser Applications," the disclosures of which are hereby incorporated herein by reference in their entireties.

TECHNICAL FIELD

Embodiments described herein relate to a document creation and management system and, in particular to systems and methods for generating an outline for a mobile application document or a webpage.

BACKGROUND

Current collaboration tools include the use of online documentation systems that are able to service content to users via a web or browser interface. However, the display and format of the content may not be adapted for use on all displays. For example, displays used on many modern smartphones are too small to display extensive content generated by some collaboration tools. Current navigation techniques require the user to manually scroll through large documents or use linked content, which may result in delays and consume additional and sometimes limited communication resources.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
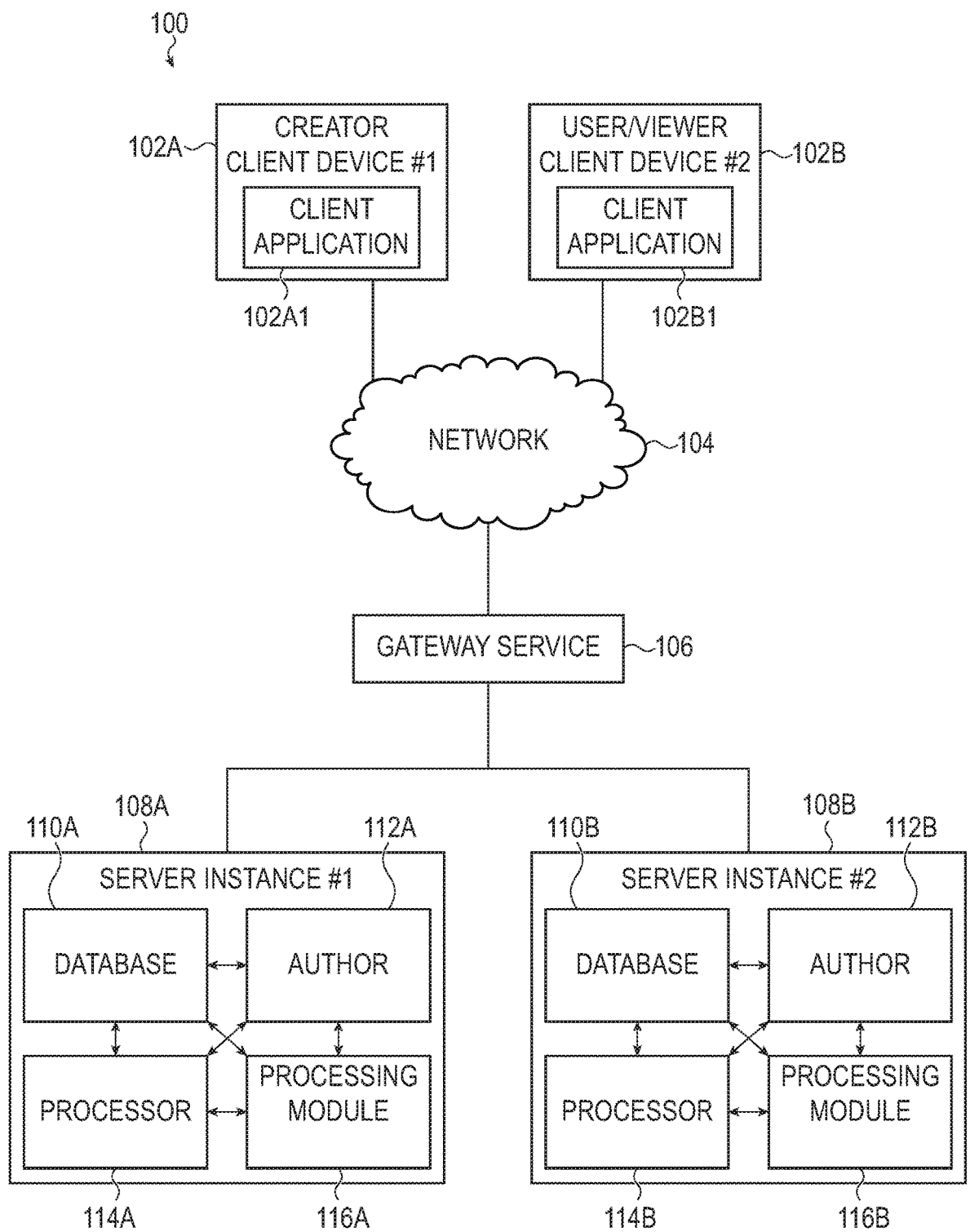
FIG. 1 depicts a networked computing environment in or over which embodiments, as described herein, may be implemented.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for generating an outline of a document in a document management system. The document may be an HTML document, JSON formatted document, Atlassian Document Format (ADF) document, or other type of document that may include rich text, node hierarchy, and other similar features. The document may be viewed using a native application that is executed or instantiated on a client device, such as a mobile phone, tablet, or other mobile device. The native application may be a dedicated mobile application, a web browser, or other client-side application that is configured to interface with a server-side application or service of a document management system.

In general, documents or other content available on a document management system may be configured for viewing on a larger display typically associated with a desktop or laptop computer system. However, viewing the same content on the relatively limited display of a mobile device, may result in the content being presented in a truncated view or requiring the user to scroll excessively in order to view the entirety of the content. Additionally, traditional navigational tools that may allow for bookmarking or easy navigation may not perform in a uniform manner (or at all) across a range of native applications that may include a variety of mobile web browsers. Accordingly, the systems and techniques described herein are directed to a system for generating an outline for the native application, which can be used to easily browse and/or navigated content on the limited display of a mobile device. As described herein, the outline may be generated in response to a request for a page or document and may include a set of entries that correspond to different portions of the page or document. The entries may preserve aspects of the native content including special characters, icons, user mentions, and other platform-specific content.

As described herein, a set of outline entries may be generated in response to the page or document being requested for display on the client device within the native application. The outline entries may be used to construct an outline that can be accessed from anywhere within the document my selecting a fixed entry point or other similar user-interface element. The load-time-generated outline may reference a set of document identifiers (document IDs), each document ID associated with a location within the document. Each outline entry may be associated with a document ID and may be selectable by a user when viewing the outline. In response to a user selection of a respective outline entry, the native application may use the document ID to automatically navigate to the respective location within the document. The resulting system may improve navigational performance for mobile browsers by reducing scrolling and, in some cases, may reduce network communications and resource allocations by only requiring rendering and display of relevant portions of a document.

The outline may be generated by or in accordance with a macro that is executed on the client device alone or in combination with a backend system. In some implementations, the macro is operated in parallel with the native application or is integrated with the native application. In some instances, the macro is initiated on the backend device in response to a request by a client device to view or retrieve a document or page. The macro or other outline-creation service or instructions may be adapted to handle special formatting issues and preserve platform-specific content like user mentions (e.g., author mentions), special icons or symbols (e.g., native emojis, bullet points, or navigational icons), custom character maps, and other rich content that may be native to the platform hosting the document or page. The macro or other outline-creation service may be able to preserve the look and feel of the original content and also enhance the information provided to the user by allowing for platform-specific content to be used within the outline entries.

Various embodiments described herein may be used to generate and display an outline of the document received on a native (mobile) browser. The outline may be generated by a client device after parsing the received document content and may allow the user to more quickly consume the relevant portions of the document or page from a truncated view provided by a mobile device. In some embodiments, the user interface may provide an entry point or other user interface element that is operable to cause display of the outline, regardless of the current portion of the document or page that is actively being displayed to the user. As described previously, the outline may provide a summary of the document and/or a list of selectable items that can be used to navigate to respective locations within the document without manually scrolling. Using an outline created for use with the native browser may facilitate the navigation of large documents on a small display screen, which may improve the effectiveness of the reader and improve the user experience.

In one example, a user may be searching for a document related to a particular project or subject in an online document management system. The user may launch a client application on a client device, which may be a phone, a tablet, or other portable electronic device having a relatively limited display. The user may provide "Project X" as a search term, keyword, or other user input via the client application. The client application may communicate the user input to a server or service hosting content. In response to the user input, the server or service may provide one of a number of documents to the client application. The client application may then display each or a subset of the number of documents on a display of the client device for review by the user. In some cases, the documents may be lengthy or the particular search term or keyword may appear only a very few times in the document. Accordingly, it may take a substantial effort on the part of the user to review the entire document to determine whether the document content is relevant. Using the load-time-generated outline, as described herein, the user may quickly navigate to relevant portions of each document without having to scroll through the entire contents of the document. Also, as described herein with respect to some embodiments, the outline entries may be constructed using the user input and may be used to direct the user to various locations within the page or document in which the search terms, keywords, or other user input appears. The outline may also allow the user to view the overall organizational structure of the content, main headings or subjects, and quickly determine the relevance of the document or page.

As described herein, a selectable affordance (e.g., a selectable button in a graphical user interface) used to access the outline may be accessible from anywhere in the document, which allows for easy navigation through a long document. In some embodiments, and by way of a non-limiting example, a user may be presented a menu option, which may be referred herein as an entry point, which may generate and/or display an outline within the native application. In some embodiments, the user may toggle the display and collapse or hide the outline using the selectable affordance or other interface element. In some embodiments, and by way of a non-limiting example, the user may display the outline, for example, by swiping right, and hide the outline, for example, by swiping left. Other similar swiping, tapping, and/or moving action may also enable the user to display or hide the outline.

In some embodiments, the document displayed on the client device may be presented as a hyper-text markup language (HTML) extensible Markup Language (XML), Atlassian Document Format (ADF), or other document format, which may provide an ability to identify various sections of the documents, for example, using a tag or a header. In some cases, the document as received from the server may be parsed by the client application for identifying one or more sections of the document. The one or more sections of the document may be a document title and one or more portions of the document, each identified using a heading and/or one or more subheadings. In some embodiments, the document as received may include a preexisting table of contents (ToC).

In some embodiments, the client application may generate an outline of a document based on a parsing operation performed on the content of the document. Specifically, the content of the document may be parsed to identify one or more sections and one or more subsections corresponding to each section of the document. The one or more sections and the one or more subsections corresponding to each section of the document may represent the document as a hierarchical structure or object. In some embodiments, a section of the one or more sections (or headings) and the corresponding one or more subsections (subheadings) may be identified based on indentions, a font size and/or font format, and so on. Text identifying subject matter for each of the one or more sections and the corresponding one or more subsections may be extracted. Additionally, platform-specific content like user mentions, special icons or symbols, and other rich content may be extracted for use in the respective outline entries. A native identifier (ID) (also referred to herein as a document ID) corresponding to a particular heading and/or subheading level may be generated and associated with each other. The native ID generated for each outline entry (e.g., heading and/or subheading) may be different from an identifier used for a respective heading and/or subheading section of the document, as stored by the server or provided by the service. That is, the host services providing the document or page may maintain a separate set of document IDs or content identifiers.

An outline, generated in accordance with the examples described herein, may reference these dynamically generated native IDs, which may enable the user to quickly navigate to the heading and/or the subheading associated with the native ID. Because the entries of the outline may be generated based on content extracted directly from the content of the page, the dynamically generated outline may retain functionality and relevance even if the document has been revised or changed over time.

In some embodiments, and by way of a non-limiting example, one or more native IDs may be generated in response to user-entered text, which may be used to parse the document for corresponding matches. The user entered text may include search terms or keywords entered into a field of the graphical user interface. In some embodiments, the search terms or keywords may be automatically determined based on a user profile. The user profile may include information such as a user's role in a group and/or an organization, activities performed by the user and/or other members of the group and/or the organization to which the user belongs, and so on. The activities performed by the user and/or the other members may include search and/or other history for a predetermined or preconfigured period of time. In one example, the activities performed by the user and/or other members may also include a technology and/or a product relevant to the user and/or the other members.

In some embodiments, and by way of a non-limiting example, the document may be parsed using one or more parsing tools. In some cases, the parsing tools may leverage existing tags or format structure of the document being parsed in order to identify hierarchical levels and determine native IDs. In some embodiments, a machine-learning algorithm and/or one or more natural language processing algorithms may be used to determine the various hierarchical document levels. In some cases, the document is parsed using a hybrid of format or tag analysis and machine learning or natural language processing techniques.

In some embodiments, and by way of a non-limiting example, the outline of the document may be displayed or hidden using a selectable affordance or other similar graphical element that is displayed regardless of which portion of the document is being currently viewed. Alternatively, the outline may be displayed at a fixed location within the document. For example, the outline may be displayed at the top or near the beginning of the document as it is being viewed on the client device.

In some embodiments, and by way of a non-limiting example, the document may be parsed and the entries of the outline may correspond to one or more tasks, actions, and comments mentioned in the document may be identified. In some cases, feedback of one or more users on the document may be identified by parsing of the documents. One or more native IDs may be generated corresponding to the one or more tasks, comments, and/or feedback of the one or more other users. As mentioned herein, the native ID may allow the user to select a corresponding entry and automatically navigate to a particular section of the document identified by the native ID. In some embodiments, a native ID may be generated for one or more tasks and/or actions assigned to the user viewing the document and/or a specific user. Similarly, a native ID may be generated for the feedback on the document provided by the user viewing the document and/or by a specific user. Similarly, the outline may include one or more entries that are generated in response to a user mention, an author mention, a tag, or other type of user-tagged content. Generating an outline that includes user-mentions or other tags may allow the user to quickly review content associated with a particular user directly from the outline.

In some embodiments, and by way of a non-limiting example, the document received from the server may include statistics of the document, which identifies information such as one or more search terms or keywords which caused the server to include the document in the search result. The client application may generate a native ID corresponding to a search term or keyword of the one or more search terms or keywords that were used by other users.

In some embodiments, and by way of a non-limiting example, a heading and one or more subheadings may be generated when no heading and/or subheading is identified based on parsing of the document. In some embodiments, generation of the one or more headings and/or subheadings may be performed using one or more machine-learning algorithms and/or natural language processing algorithms.

In some embodiments, a specific location for displaying the generated outline on a display of the client device may be configurable by the user. For example, the generated outline may be displayed on a left or a right panel of the document on the display. In some cases, the outline may be displayed on a top of the document when the document is displayed on the client device.

In some embodiments, and by way of a non-limiting example, an outline, when displayed on a display of the client device, may also display a user's current location on the document. This may enable the user to determine a relative position of other entries within the document and determine what content is before and what content is after the portion being presently displayed.

In some embodiments, the client application may send a request to receive an updated document from the server. The request to receive the updated document may be sent automatically at a predetermined time period and/or upon request by the user. For example, a request to automatically request an updated document may be sent by the client application at every minute, every 5 minutes, every 15 minutes, or some other time interval that has elapsed after the document is first displayed on the client device. In some embodiments, upon receiving an updated document from the server at the client device, the client device may regenerate an updated or modified outline that includes content that may have been added or removed from the document or page.

In some embodiments, and by way of a non-limiting example, the outline may also include one or more conversation points, such as comments, actions, or tasks associated with the particular heading and/or subheading. A native ID corresponding to each of one or more conversation points may also be generated as described herein and displayed on the outline. The user may interact with the one or more conversation points displayed on the outline to access the one or more conversation points directly as described herein in accordance with some embodiments.

As previously mentioned, the outline may be rendered in response to selection of a selectable affordance or entry point, which may be displayed on the top of the page and/or in the navigational tool bar of the native browser. In one example, a location for a selectable affordance or entry point may be configurable by the user. Accordingly, in some embodiments, a user can access the outline regardless of which portion of the document is being currently viewed. In this way, the user may not be required to scroll up or down to access the outline from the current location of the user on the document.

In some embodiments, the outline may be automatically generated as a user is creating and/or editing a document. In some embodiments, a document transmitted to the client device from the server may be parsed based on one or more headings in the document. One or more subsections of the document corresponding to each heading of the one or more headings in the document may be identified. In some embodiments, an outline may be generated for a heading and/or a subheading based on one or more text properties associated with the heading and/or the subheading, an attribute name and/or an attribute text, and so on. In some embodiments, an outline for a heading may be generated by concatenating an outline generated for each subheading of the heading. In some embodiments, a document transmitted to the client device from the server may be transmitted using a webservice, for example, representation state transfer (REST), and so on, as a JavaScript Object Notation (JSON) object. The document may be parsed using JSONSerialization or other relevant technologies.

Various embodiments described above may be related to a front-end application (e.g., a client application) running on a client device. The front end application may be communicatively coupled with a document management system having a backend application. The backend application may create a document entry of a draft document created by the user, and save the draft document on the document management system. The document may be saved in a memory and/or a database in a local or cloud environment. The backend application may also save other information, for example, an author name, a draft status of a draft document, and so on, associated with the document in the memory and/or one or more databases or other computer storage devices.

In some embodiments, the backend application may authenticate a user of the document management system, and based on the authentication result, the backend system may render one or more documents to the user for displaying on a user's client device. As described previously the outline may be generated in accordance with a particular user ID and may generated respective outline entries that correspond to preferences associated with the user ID or a user group associated with the user ID>

A document in the present disclosure may also be referred to as a page or a webpage. The document may be displayed as a uniform resource locator (URL) on a page or a webpage on the GUI of the client device. In some cases, the document may be an issue (e.g., a bug or a customer reported issue/trouble ticket), an issue description, a blog post, a text entry, and/or any other form of user-generated content.

Various embodiments described above are thus related to systems and methods for generating and displaying an outline of a document on a client device. The embodiments described herein may allow the user to review the documents efficiently as described herein. In the following sections, various embodiments are described using drawings.

FIG. 1 depicts a networked computing environment in, or over which, embodiments as described herein may be implemented. As shown in FIG. 1, a computing environment 100 may include a first client device 102A and a second client device 102B. The first client device 102A may be a client device on which a first user may be creating or viewing a document. Accordingly, the first client device may be a client device that belongs to a first user of the document management system. The second client device 102B may be a client device belonging to another user (a second user) of the document management system, and may be used to access various documents, including the document created by the author on the first client device 102A. The second client device 102B may thus belong to a viewer of the document.

In accordance with some embodiments, the first client device 102A and the second client device 102B may be communicatively coupled with a network 104. The network 104 may be a local area network (LAN), a wide area network (WAN), a cellular network such as a 3G network, a 4G or a long-term evolution (LTE) network, and/or a 5G network, and so on. The first client device 102A and the second client device 102B may be communicatively coupled with one or more instances of an application server, for example, a first server instance 108A and/or a second server instance 108B, via a gateway service 106.

By way of a non-limiting example, in some embodiments, the gateway service may be a load balancer system or a load balancer service. The gateway service 106 may route the first client device 102A and/or the second client device 102B to the first server instance 108A and/or the second server instance 108B based on various criteria, including but not limited to, a central processor usage, a memory usage, and/or a bandwidth availability, and so on.

In some cases, each client device may be statically assigned a particular server instance. For example, the first client device 102A may be statically assigned to the first server instance 108A. Accordingly, all requests from a front end application running on the first client device 102A may be forwarded to the first server instance 108A.

In some cases, each client device may be dynamically assigned a server instance. Accordingly, all requests from a front end application running on the first client device 102A may be forwarded to the first server instance 108A and/or the second server instance 108B based on the various criteria mentioned above, such as a central processor usage, a memory usage, and/or a bandwidth availability, and so on.

In some cases, the first server instance 108A and/or the second server instance 108B may be implemented on a physical hardware or a virtual machine. Each of the first server instance 108A and the second server instance 108B may include a database 110A or 110B, an authentication module 112A or 112B, a processor 114A or 114B, and/or a document processing module 116A or 116B. The document processing module 116A and/or 116B may be a backend application mentioned above.

In some embodiments, the first server instance 108A and the second server instance 108B may be communicatively coupled with each other. The first server instance 108A and the second server instance 108B each may be periodically synced with each other using a sync service. In some cases, the first server instance 108A and the second server instance 108B may be configured to provide redundancy, for example, as an active-active mode, an active-standby mode, and so on.

In some embodiments, each of the first client device 102A and/or the second client device 102B may be running a frontend application 102A1 and/or 102B2, respectively. The frontend application may be configured to operate as an instance of software (a "client application") executing on a client device and the backend application running on the first server instance 108A and/or the second server instance 108B may be configured to operate as an instance of software (a "backend application") executing over a processor allocation and memory allocation of a cloud computing platform, which may include one or more physical or virtual host servers.

Accordingly, as described above, the frontend application and the backend application may be configured to communicate over one or more networks, including private and public networks, to exchange information related to managing document creation and publication. For example, a user device such as a laptop may be configured to leverage a processor and memory thereof to instantiate an instance of the frontend application, which in turn may leverage a display of the laptop to render a graphical user interface (GUI) for the document management system to the user. In some cases, the frontend application may be configured to operate in a browser of the laptop, although this is not required of all embodiments. In other cases, the frontend application may be a native application.

The user of the laptop can operate the graphical user interface of the frontend application to create a draft document or view the created draft document which may be stored in the database 110A and/or 110B. More particularly, inputs received by the graphical user interface of the frontend application may cause the frontend application to generate one or more requests to one or more application programming interfaces (APIs) of the backend application. In response to the requests, the backend application may store the received data in the database 110A and/or 110B and may display to the user via the graphical user interface.

In some embodiments, the backend application may cause a number of documents to be displayed on the GUI of the client device based on authentication of the user.

In some cases, the networked computing environment 100 may be implemented with a client-server architecture in which the first server instance 108A and/or the second server instance 108B may exchange requests and responses (which may comply with a communication protocol such as HTTP, TCP, UDP, and the like), with one or more clients, such as the first client device 102A and/or the second client device 102B. In other cases, event-driven architectures may be used. In this manner, a host server of an issue tracking service can serve information to each client device, and in response, each client can render a graphical user interface on a display to present that information to the user of that respective client device.

The frontend application (a client application or native application) may be defined by executable code stored in a memory of, and executed by a processor of, a client device. In particular, as noted with respect to other embodiments described herein, a client device may be supported by one or more virtual or physical hardware devices, referred to herein as resource allocations, that may be leveraged to perform, coordinate, or otherwise instantiate one or more services or functions of the client device.

For example, a client device as described herein can include one or more resource allocation modules or functions (e.g., a processor allocation, a memory allocation, and/or a network connection, and so on) 202A described below with reference to FIG. 2, which can be leveraged to instantiate the client application. In particular, the frontend application can be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the frontend application (in some examples, over an operating system) to facilitate interaction with, and use of the client application by, an end-user.

Similarly, the backend application (also referred to as a host service or a server application) may be defined by executable code stored in a memory of, and executed by a processor of, a host device, a server instance, or a service. In particular, as noted with respect to other embodiments described herein, a host device may be supported by one or more virtual or physical hardware devices (co-located or geographically distributed), referred to herein as resource allocations, that may be leveraged to perform, coordinate, or otherwise instantiate one or more services or functions of the host device.

For example, a host device as described herein can include a processor allocation, a memory allocation, and/or a network connection allocation that can be leveraged to instantiate the backend application. In particular, as with the frontend application, the backend application can be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the server application (in some examples, over an operating system) to facilitate interaction with, and use of a document management system by one or more instances of the client application.

The foregoing examples and description of instances of purpose-configured software, whether accessible via API as a request-response service, an event-driven service, or whether configured as a self-contained data processing service, are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways, several of which are described below.

Figure 2:
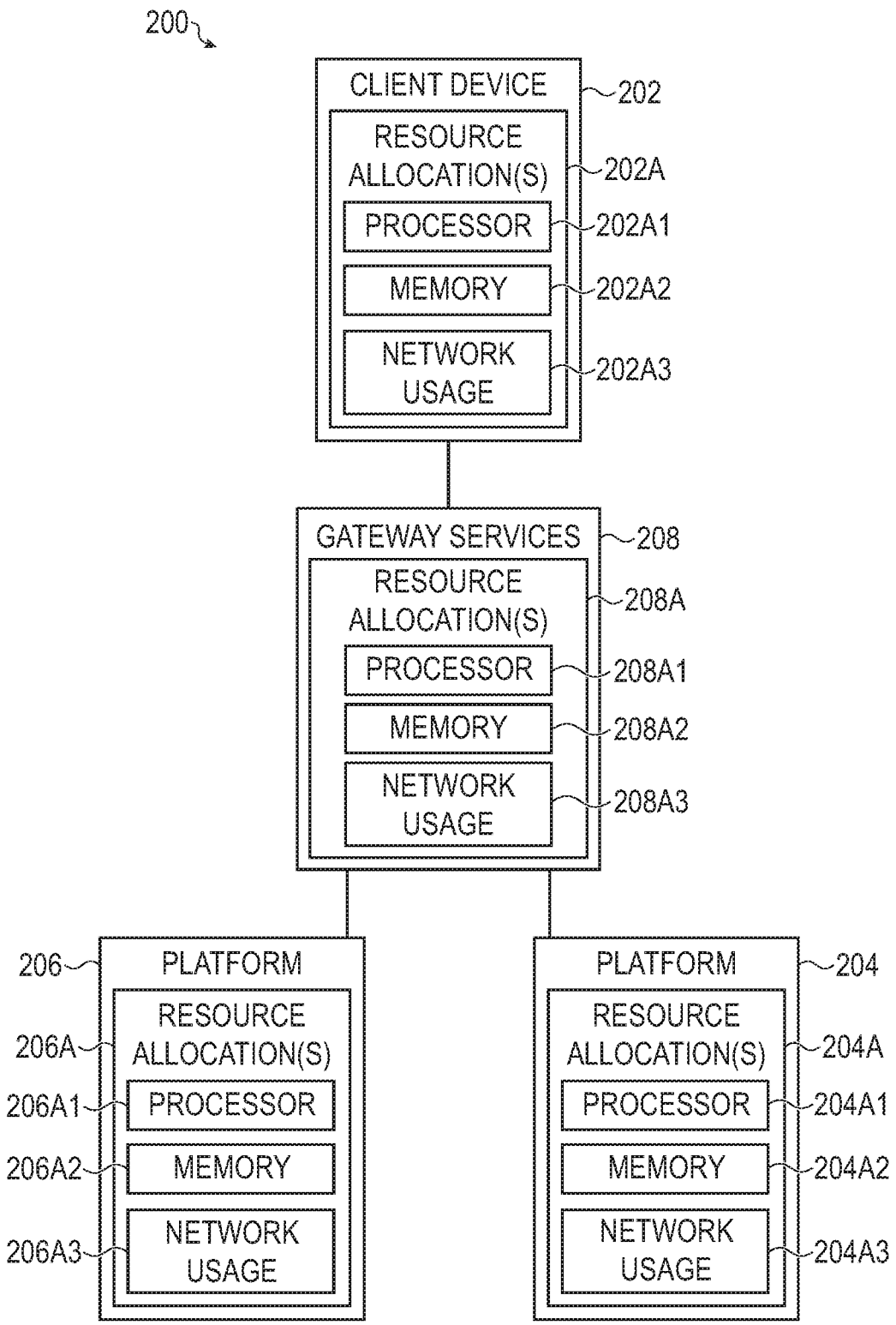
FIG. 2 depicts another view of a networked computing environment in or over which embodiments, as described herein, may be implemented.

FIG. 2 depicts another view of a networked computing environment in, or over which, embodiments as described herein may be implemented. As shown in a network 200, a client device 202, including one or more resource allocation modules 202A, may be communicatively coupled to a first platform 204 and a second platform 206, including one or more resource allocation modules 204A and 206A, respectively, via a gateway service 208. The gateway service 208 may also include one or more resource allocation modules 208A.

In some embodiments, the network 200 may, for example, be an intra-organization network. A client device 202 may be a workstation, a computer, a laptop, a tablet, and/or another suitable client device. The client device 202 may be implemented as a hardware or as a virtual machine. The one or more resource allocation modules 202A may allocate resources, including but not limited to, a processor or a computational resource 202A1, a memory 202A2, network usage or bandwidth 202A3, and so on, as required by the client device 202. The client device 202 may be running an application ("a client application" or "native application") which may be a frontend application, referenced herein. In some cases, there may be more than one instance of the backend application running on the client device 202.

The first platform 204 and the second platform 206 may be a server, an application server, and/or an instance of a server. The first platform 204 and/or the second platform 206 may be implemented as hardware or as a virtual machine. The first platform 204 and the second platform 206 each may be running an application ("a server application") which may be a backend application, referenced herein. In some cases, there may be more than one instance of the backend application running on each of the first platform 204 and/or the second platform 206. The one or more resource allocation modules 204A and/or 206A may allocate resources, including but not limited to, a processor or a computational resource 204A1 and/or 206A1, a memory 204A2 and/or 206A2, network usage or bandwidth 204A3 and/or 206A3, and so on, as required by the first platform 204 and/or the second platform 206.

The gateway service 208 may act as a frontend, a broker, a load balancer, and/or a router for the first platform 204 and/or the second platform 206. The gateway service 208 may be implemented as hardware or a virtual machine. The one or more resource allocation modules 208A may allocate resources, including but not limited to, a processor or a computational resource 208A1, a memory 208A2, network usage or bandwidth 208A3, and so on, as required by the gateway service 208.

In some cases, the client device 202, the gateway service 208, the first platform 204, and/or the second platform 206 may be a microservice, an executable code, a JavaScript, a library, a JAR file, and so on.

The client device 202 may include a processor and a memory. The processor may be any suitable computing device or logical circuit configured to execute one or more instructions to perform or coordinate one or more operations on or to digital data. In many embodiments, the processor or processors of the client device 202 may be a physical processor, although this is not required of all embodiments; virtual components may be suitable in some implementations. Similarly, a memory of the client device 200 may be configured and/or implemented in a number of suitable ways and may be partially or completely virtualized.

In some embodiments, the processor of the client device 202 is configured to access at least one executable asset from the memory of the client device 202. More particularly, the processor of the client device 202 may be configured to access a data store portion of the memory to load, into a working portion of the memory, at least one executable asset or executable program instruction. In response to loading the instruction or executable asset into working memory, the processor of the client device 202 may instantiate an instance of software referred to herein as a client application.

In many embodiments, a client application (also referred herein as a "frontend application") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services, for example, the first platform 204 and/or the second platform 206 (e.g., documentation or content creation service). In this manner, a documentation or content creation service is defined in part by a frontend executing/instantiated on a client device and in part by a backend executing/instantiated on a host server of the hosted platform services 204 and/or 206 in communication with the frontend.

In this example, the first platform 204 and/or the second platform 206 may include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the first platform 204 and the second platform 206) and the client device 202 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

An example implementation of the network environment of FIG. 1 and/or FIG. 2 is described below with respect to FIGS. 3A-3E, 4A-4C, 5, and 6 depicting an example graphical user interface (GUI) of a client application of a document management system, as described herein. While the following screen shots and examples are provided as an illustration of the principles of this disclosure, the examples are not intended to be limiting in nature and merely serve to demonstrate the use of the proposed systems and techniques.

In one example use of the network environment of FIG. 1 and/or FIG. 2, a user may have received a document or page, which may be, for example, an HTML document, XML document, YAML document, Atlassian Document Format (ADF) document, or other type of document that may include rich text, node hierarchy, and other similar features. The document may be viewed using a native application that is executed or instantiated on a client device. As described herein, an outline may be generated and displayed on a display of the client device, such that the user can review the document and determine relevance of the document efficiently.

Figure 3A:
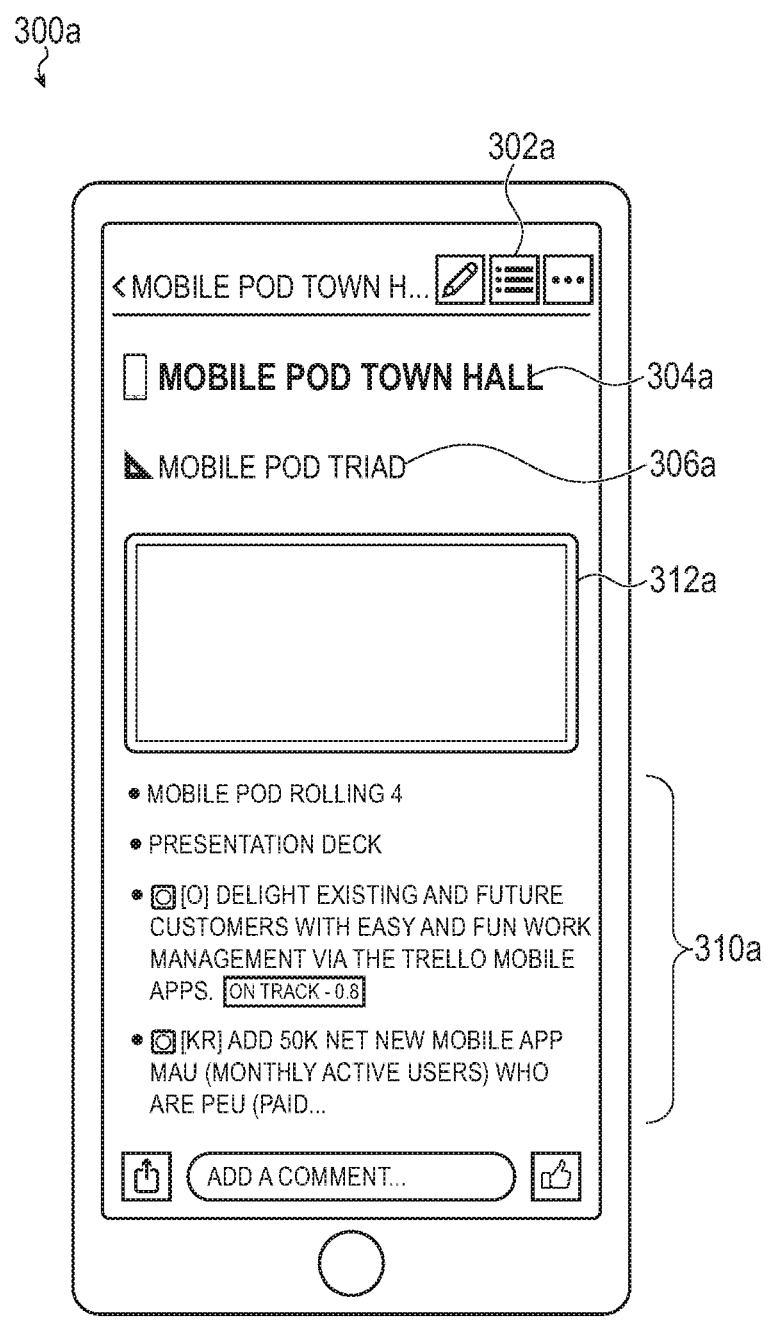
FIGS. 3A-3E depict an example graphical user interface (GUI) of a client application of a document management system, as described herein.

FIG. 3A depicts an example GUI of a client application of a document management system, as described herein. As shown in FIG. 3A, in an example GUI 300a of a client application, a user may have launched a client application 102A1 or 102B1, described herein in accordance with some embodiments, on her client device 102A or 102B, respectively, such as a phone. Using the client application 102A1 or 102B1, a user may be viewing a document that may have been sent to the user's client device 102A or 102B by a server instance 108A or 108B via a gateway service 106 and a network 104.

In some embodiments, and by way of a non-limiting example, the document may have been sent to the client device, for example, based on the user's particular search criteria, for example, based on a specific search term or keyword. As shown in the example GUI of the client application 300a, a navigational tool bar may include a selectable affordance or selectable entry point 302a for the user to interact with the document. As described herein, the selectable affordance may cause the display of the outline, which has been dynamically created in response to a request to view the particular page or document. The selectable affordance or selectable entry point 302a may be displayed at the top of the graphical user interface regardless of the portion of the document or page being displayed in the lower or remainder of the graphical user interface. In some cases, the document title 304a may be displayed on the navigational tool bar all the time the user is viewing and/or editing the document.

As shown in the example GUI of the client application 300a, the document may include one or more sections, each identified by its corresponding heading. Each of the one or more sections may include one or more subsections, each identified by its corresponding subheading for the section. Each section of the one or more sections and each subsection of the one or more subsections may include content. The content may include text data, audio data, video data, images, graphs, and so on. In one example, the document titled "Mobile Pod Town Hall . . . " 304a may have one section 306a, which may have a heading "Mobile Pod Triad," and may also include video data 312a and text data 310a as its corresponding associated content.

As described herein, in accordance with some embodiments, the menu option or entry point 302a may enable the user to launch an outline-based navigation of the document or page. In one example, the entry point 302a may allow the user to view an outline for the document that has been created in response to document retrieval and that has been formulated for use in the native browser or native client application. The entry point 302a may also enable the user to specify the manner in which the outline is displayed or viewed. For example, the user may configure the client application to display the generated outline on the top of the document, or on a right or a left panel of the document. In some instances, the entry point 302a may be used to display a user-configured outline that is generated in accordance with user-specified criteria, keywords, or other user-specified controls. For example, a user-configured outline may be configured to generate an entry for each instance of a word or term matching a keyword or other specified criteria. Similar to the other embodiments described herein, user selection of an outline entry may result in a display of the respective portion of the document or page that is associated with the native ID generated for the selected entry.

Figure 3B:
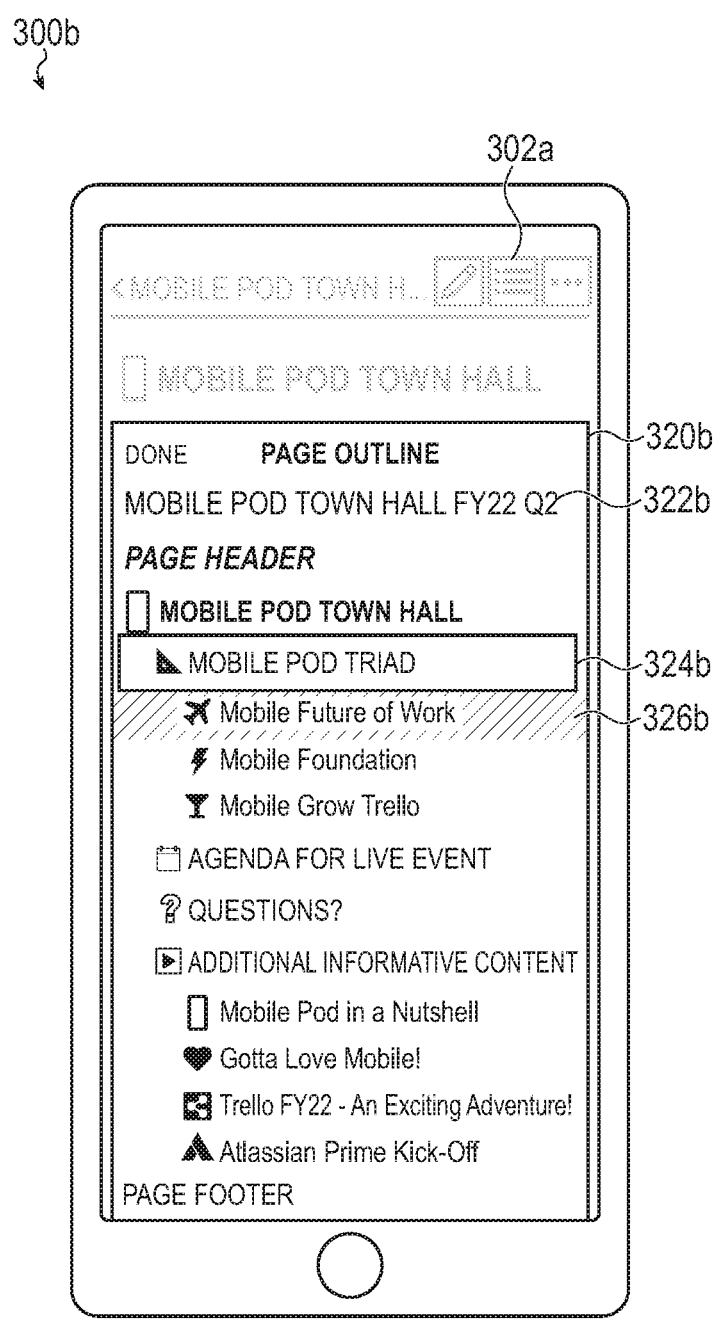

FIG. 3B depicts an example GUI of a client application of a document management system, as described herein. As shown in FIG. 3B, in an example GUI 300b of a client application, a user may have selected an option to generate and/or display an outline 320b for the document using, for example, selection of the entry point 302a of FIG. 3A. As described previously, the outline 320b may be dynamically generated in response to a request to load or view the page or document from the document system.

As described herein in accordance with some embodiments, the generated outline 320b may include a list of entries that correspond to one or more sections or subsections associated with various portions of the document identified based on the parsing of the document on loading. The various entries corresponding to one or more sections or subsections associated with the one or more sections may be identified, as described herein, based on an indent value, a font size, a font type, or formatting structure of a heading or subheading associated with each section and/or subsection. One or more hierarchical levels in the document may be identified based on one or more structural characteristics of the document alone or in combination with one or more tags, markup designations, or other properties of the document that may be used to designate regions or portions of the document or page. In this way, the characteristics of the text, tags, or markup designations may be used to identify the one or more hierarchical levels in the document. Additionally or alternatively, one or more machine language algorithms or natural language processing algorithms may be used for document parsing and identifying the one or more sections and one or more subsections associated with the one or more sections.

In response to a user selection of the entry point 302a of FIG. 3A, an outline 320b as shown in FIG. 3B may be caused to be rendered on the client device. As shown in FIG. 3B, the dynamically generated outline 320b may be displayed as an overlay over the document or page displayed on the client device. The generated outline 320*b* may include a title of the document 322*b* and outline entries 324*b*, 326*b*, which may be displayed in an hierarchical structure that mirrors a structure of the document or page determined by the outline generation service. As shown in the present examples, the document or page includes multiple levels of hierarchy in which portions of the text have a parent-child or topic and subtopic relationship. The corresponding outline 320*b* may have a hierarchical structure of entries that corresponds to the hierarchical structure of the document content. Each entry of the outline may be associated with a dynamically created ID, which corresponds to a location of within the document or page and may include text that has been extracted from a respective portion of the document or page. Each outline entry may be selectable and in response to a user input or user selection of a corresponding outline entry, the outline may be closed and the user interface may automatically redirect or navigate the user to a respective portion of the document or page associated with the native ID.

The outline entries may preserve some of the original formatting and rich content associated with the original page or document. In particular, special characters (as shown in FIG. 3B) including emojis, images, and other special characters supported by the native document or page, may be preserved even though the macro or other service that generates the outline may not be part of the native application. Additional rich content including user mentions, comments, tags, or other features may also be preserved in the respective entries of the outline. The entry 326*b* may include one or more special characters (e.g., an airplane icon) and may also include other rich content like user or author mentions or other user tags. User or author mentions or other tagged content may be indicated in the outline using additional icons, markings, or other visual indicia which may be selected or for which a name of the respective user is revealed when selected or other user input is provided to the respective outline entry. In some cases, the outline is generated to designate or indicate items in which a particular user or an author is mentioned. In some cases, the outline is generated to designate or indicate items in which a specified group of users or a team is mentioned. This may allow a user to quickly scan the outline 302*a* and identify content that is directed to himself/herself or a respective team or group of users.

In some implementations, the parser is able to generate one or more entries corresponding to items in the comments portion of the document page. For example, the page or document may be parsed and content that mentions the user within the comments is assigned a native ID and included in the outline as a separate entry. Additionally or alternatively, the page or document may be parsed and comments associated with the user or part of a user group may be assigned a native ID and included in the outline as a separate entry.

The parser may also be configured to identify tasks or lists of items within the content of the page or document. Each set of tasks or list of items may be assigned a native ID and included in the outline as an entry. In some cases, the individual items may each be listed as an item or as a subitem under a heading or list topic entry. In some implementations, each item may be identified as a task or action item by the parser. In this case, the menu may create a corresponding entry or set of entries that is displayed with an open box that may be checked as the various entries are viewed or completed.

In some embodiments, and by way of a non-limiting example, a current location or respective portion of a document previously or currently being displayed for a user may be designated in the generated outline using a visual indicia. In this example, the current position of the document is designated using a rectangular box, which may surround the respective entry in the outline (see, e.g., item 324*b*). Other types of visual indicia may also be used including use of an arrow, bullet or other special character, bolded font, highlighting, increased text size, and other similar techniques for creating a visual designation.

As described herein, a native ID may be generated for each entry corresponding to a section and/or subsection based on a parsing of the document. Each generated native ID may uniquely identify a section or a subsection of the document. Accordingly, the native ID may be referenced when a user selects a respective entry in the dynamically generated outline 320*b* and used to render the respective portion of the page or document associated with the native ID.

In one example implementation, user selection of a respective entry in the outline 320*b* causes that portion of the outline to expand and display a summary or excerpt of the text following the portion of the content associated with the respective native ID. For example, in response to a user selection of entry 326*b* may result in a display of a portion of the text from the corresponding section (e.g., image 312*c* of FIG. 3C) to be displayed within the outline 320*b*. In some cases, the content can be hidden or collapsed by selecting the entry 326*c* subsequent to the display or expansion of the content. In some cases, each document entry that is available for expansion is indicated as such with a caret, arrow or other special symbol that, when selected causes the display or expansion of the respective content.

Figure 3C:
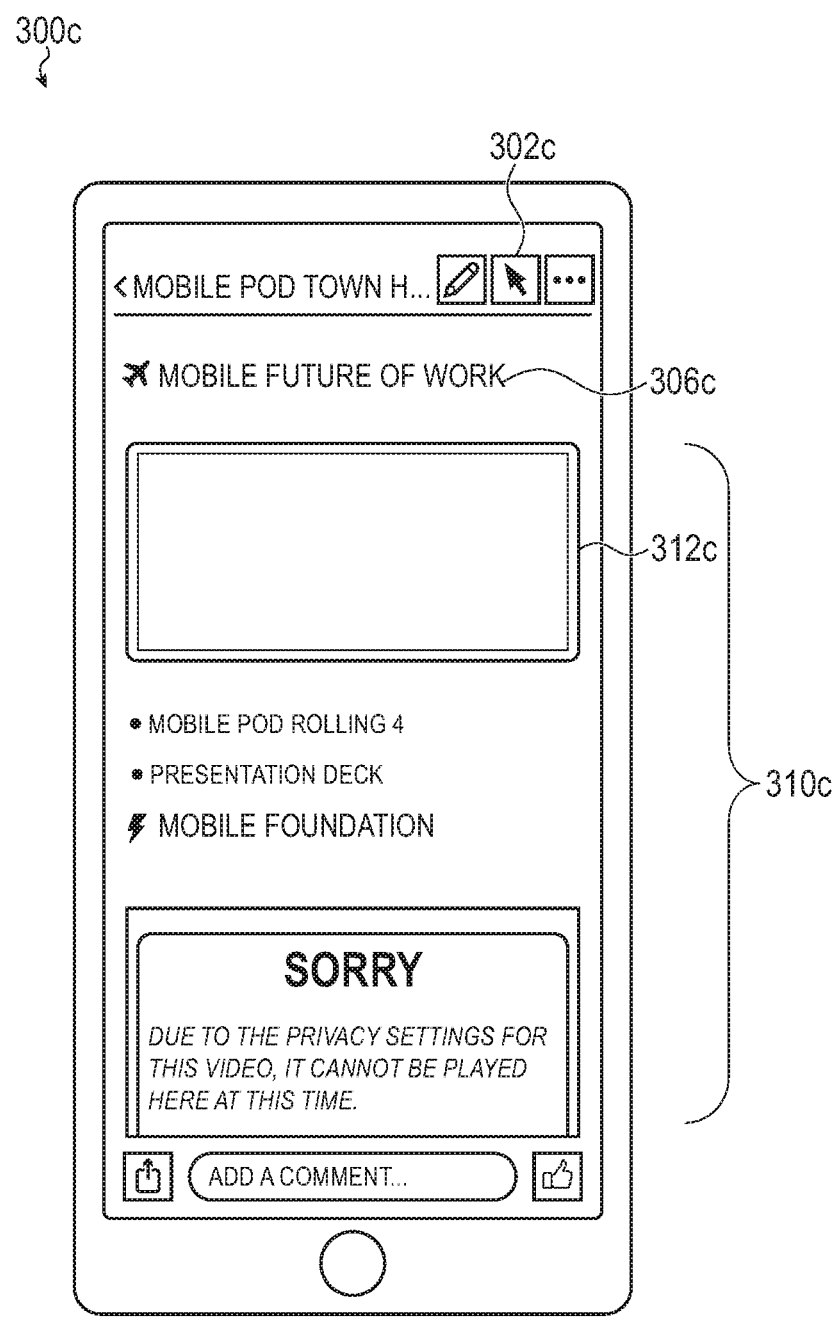

In one example, as shown in an example GUI 300*c* of a client application shown in FIG. 3C, a user may have selected (e.g., clicked, tapped, or otherwise provided user input) with respect to the entry 326*b* having the text "Mobile Future of Work" on the generated outline 320*b*. In response to the user's interaction with the entry 326*b* of the generated outline 320*b*, the document or page may automatically be redirected to the portion of the document tagged with the native ID, which corresponds to the particular subsection titled "Mobile Future of Work," 306*c*. Content 310*c* associated with the subsection 306*c* may also be displayed, where the content 310*c* may include, but is not limited to, video data 312*c*, text data, and one or more subsections. Thus, a subsection of a section may also include one or more subsections.

As shown in the example GUI 300*c*, a menu option or entry point 302*c* positioned on the navigational tool bar, similar to the entry point 302*a* shown in FIG. 3A, may be displayed on the GUI while an outline is displayed, and/or when a user is reviewing the document using the outline, or any section or subsection of the document. In other words, using the entry point 302*c* to display the outline, a user can access any section and/or subsection of the document without scrolling through the document, which is shown in an example GUI 300*d* of a client application shown in FIG. 3D. A user may select entry point 302*c* while reviewing the subsection 306*c* titled "Mobile Future of Work," and return to the outline of the document 320*d*. As shown in the displayed outline 320*d*, the outline 320*d* may indicate that the user was last on the subsection titled "Mobile Future of Work" as shown by 324*d*, in which a rectangle box is displayed around the subsection from where the user has come to the outline.

Figure 3D:
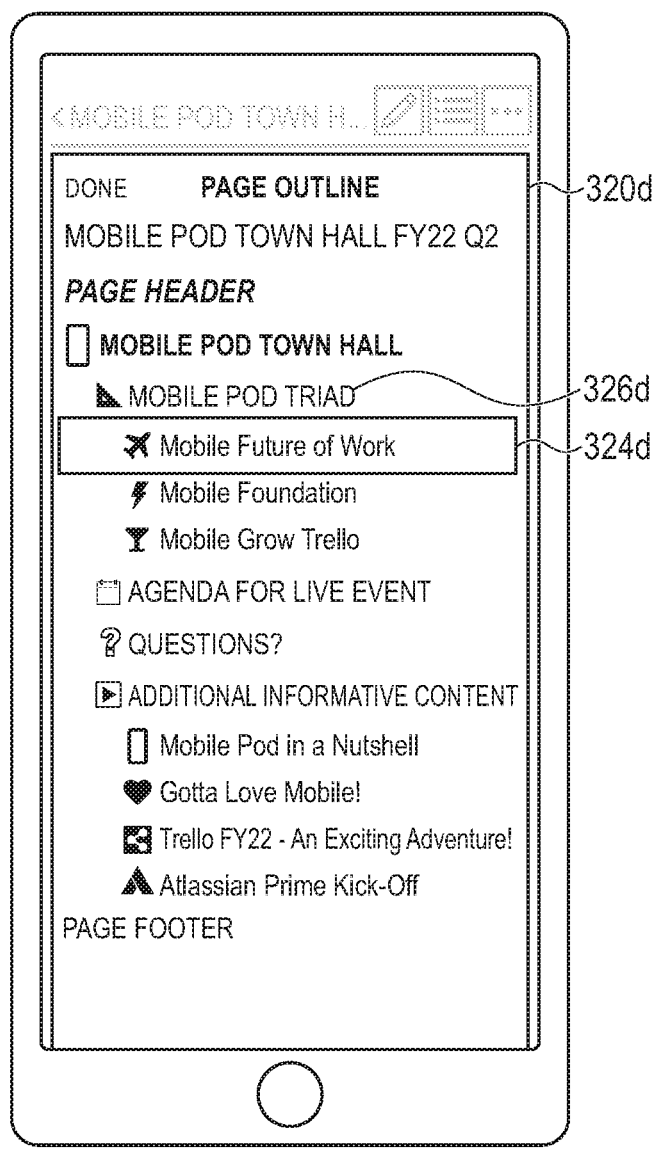
Figure 3E:
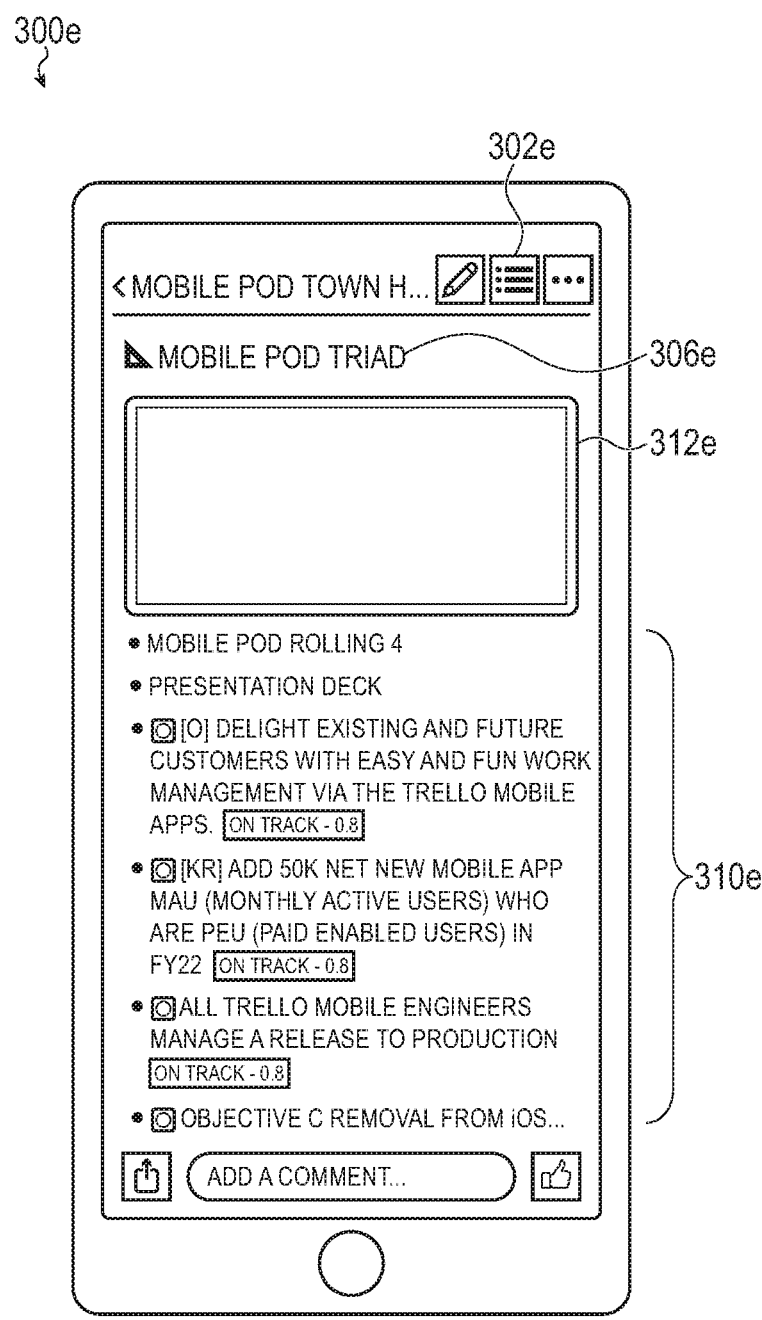

With reference to FIG. 3D, a user can select the entry titled "Mobile Pod Triad" 326*d*, and as shown in an example GUI 300*e*, the document may be automatically scrolled or navigated to the portion of the document associated with the native ID corresponding to the entry titled "Mobile Pod Triad" 306*e*. The respective portion of the document may include corresponding content, for example, video data 312*e*, and text data 310*e*. As described herein, an entry point 302*e* may be displayed on a navigation tool bar, which, in response to a user selection, may cause display of the outline allowing the user to easily navigate to any section and/or subsection of the document via selection of a respective entry.

Figure 4A:
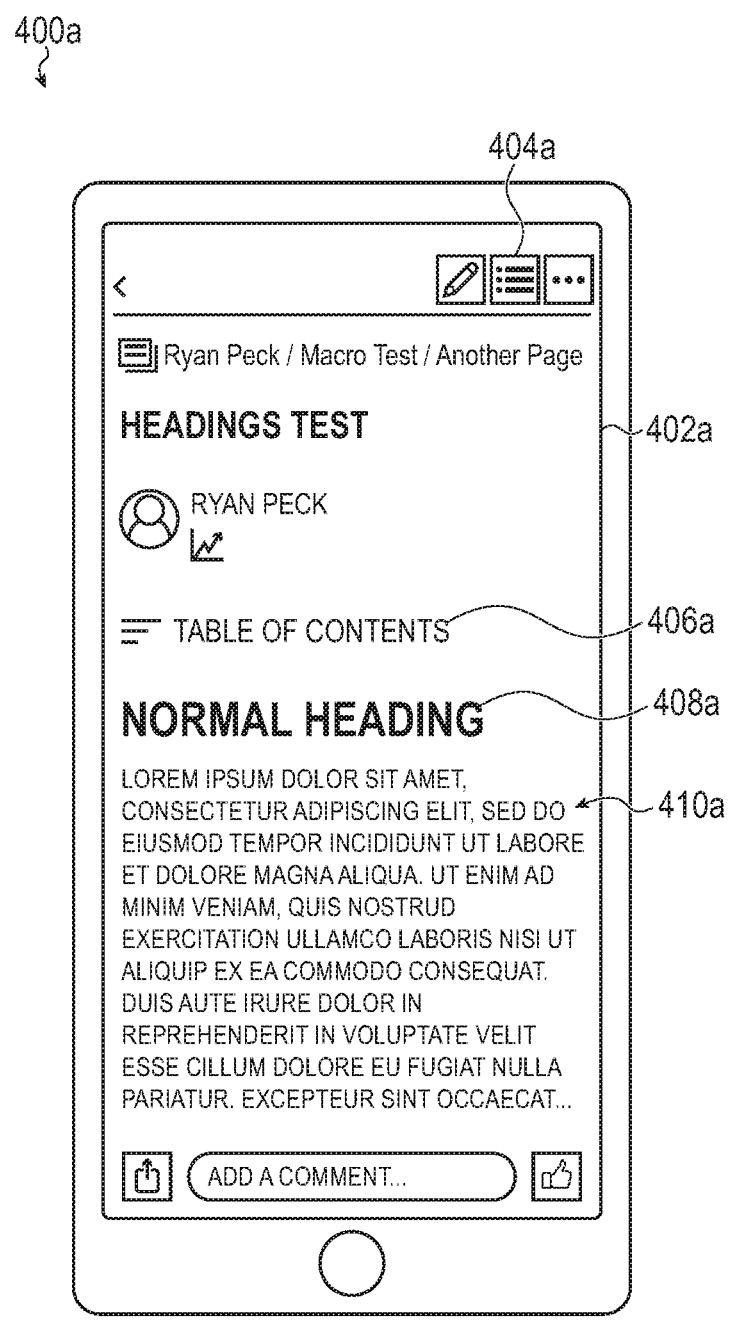
FIGS. 4A-4C depict another example GUI of a client application of the document management system, as described herein.
Figure 4B:
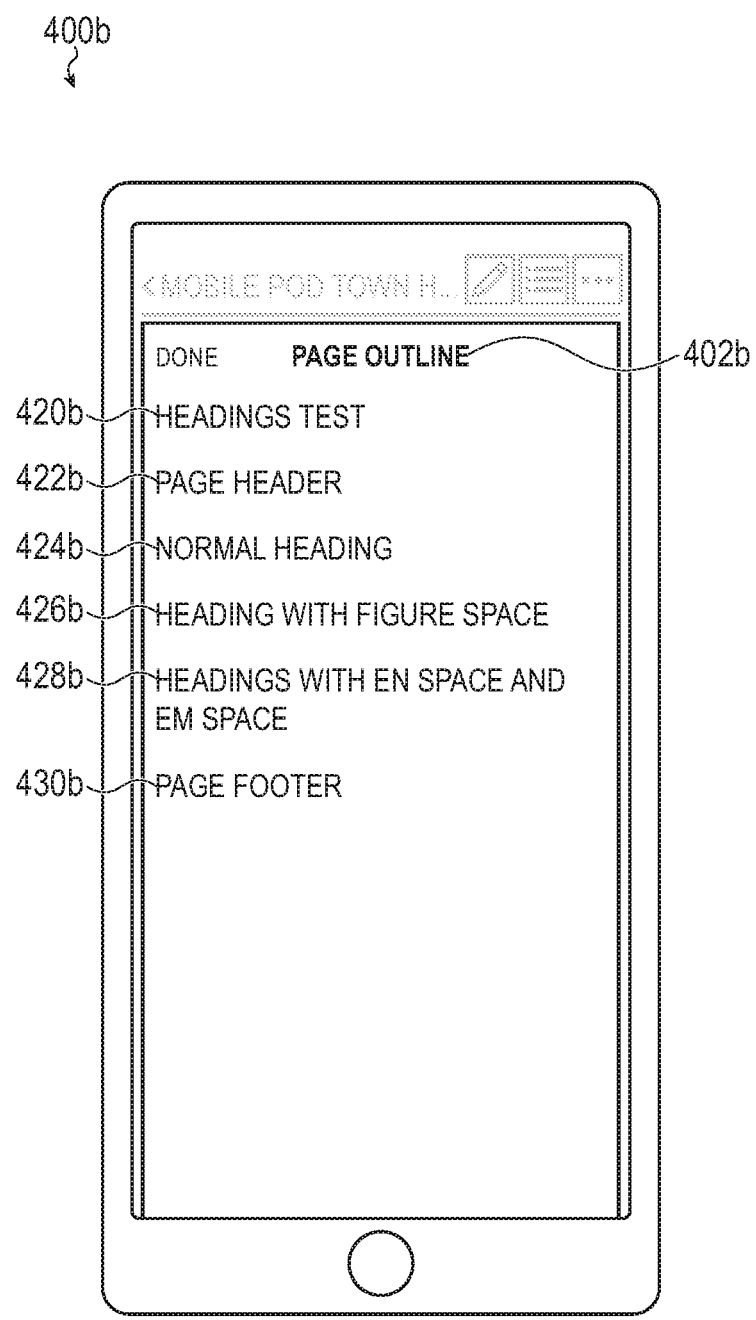
Figure 4C:
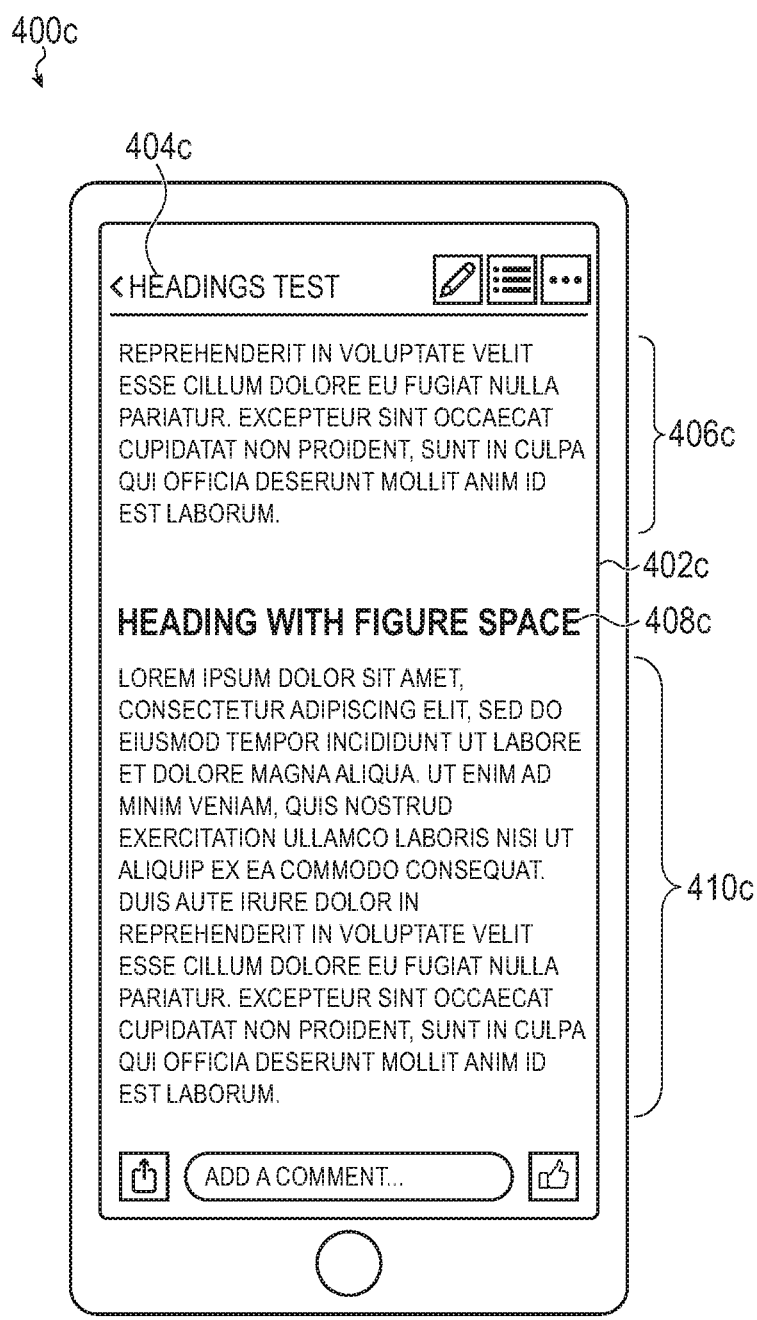

FIGS. 4A-4C depict another example GUI of a client application of the document management system, as described herein. As shown in FIG. 4A, an example GUI 400*a* may show a document 402*a*, for example, a mobile application page 402*a*, on a display of a client device. As described herein with reference to FIGS. 3A-3E, a selectable entry point or menu option 404*a* may be displayed on a navigational tool bar of the document displayed on the client device. The menu option 404*a* may allow the user to generate an outline, display the outline, hide the outline, and so on. The document 402*a* may include a table of contents 406*a*. In some embodiments, a table of contents may be generated in a similar way an outline may be generated for the document. The table of contents 406*a* may be expandable and/or collapsible. The document 402*a* may include one or more sections identified by a heading. As described herein, a section may be identified based on indent value, a font size and/or a font type, and so on. One such section titled "Normal Heading" 408*a* is shown in 400*a* with its corresponding content 410*a*.

As described herein, in accordance with some embodiments, an example GUI 400*b* may illustrate an outline 402*b* generated for the document 402*a*. A user may cause display of the outline for the document 402*a* using an option shown under menu option 404*a*. As described herein, the outline 402*b* may include various sections and/or subsections 420*b*, 422*b*, 424*b*, 426*b*, 428*b*, and 430*b*.

Each section and/or subsection shown in the outline 402*b* may have a corresponding native ID, which may be used to take the user to a particular section or subsection of the document according to the user's input. In one example, a user may be taken to a section or subsection titled "Heading with Figure Space" 408*c*, as shown in an example GUI 400*c*, when a user provides an input in the outline 402*b* to jump to a section or a subsection 428*b*. Content 410*c* of the section 426*b* may be displayed with its heading 408*c* as shown in the example GUI 400*c*. A document 402*c* may be similar to the document 402*a*, and 406*c* may represent content of another section or subsection of the document 402*c*. A title of the document 404*c* may also be displayed along with a menu option in the navigational tool bar of the document as shown in FIG. 4C.

Figure 5:
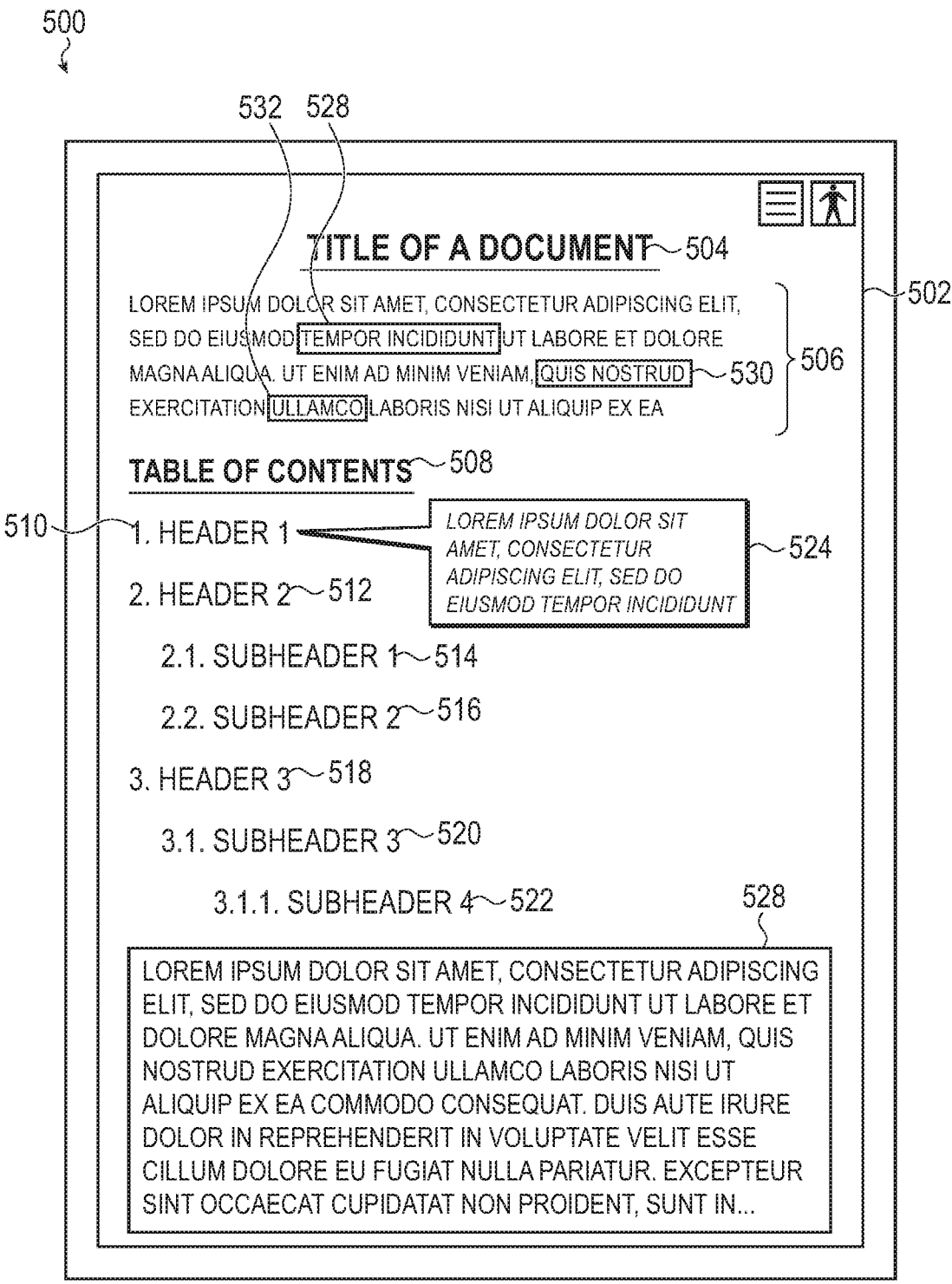
FIG. 5 is another example screen of the GUI of the client application of the document management system, as described herein.

FIG. 5 is another example screen of the GUI of the client application of the document management system, as described herein. As shown in an example GUI 500, an outline of a document may be displayed on a display 502 of a client device. The displayed outline may include a title of a document 504 and a summary of the document 506. The summary of the document 506 may be generated based on parsing of the document using one or more machine-learning algorithms or natural language processing algorithms. The summary may be generated based on a user profile, as described herein, in accordance with some embodiments. The summary of the document 506 may include one or more native IDs 528, 530, 532, which are associated with a portion of the text (as shown using the designated boxes). The designated text tagged with the native IDs 528, 530, 532 may be selectable and, in response to a user selection, may enable the display to automatically navigate to a respective section or subsection of the document associated with the selected designated text. The native IDs 528, 530, and 532 may be generated for one or more keywords or search terms specified by the user, a role of the user within the system, a project or product associated with the user, or other configurable criteria. The summary of the document 506 may display information prepared based on parsing of the document, a user profile, a product, a technology, and so on. Accordingly, the summary of the document may be different for a different user. The summary of the document thus generated may enable the user to review and determine relevance of the document efficiently.

In some embodiments, the generated outline may also include a table of contents 508, and one or more sections 510, 512, 518, and one or more subsections of the one or more sections 514, 516, 520, and 522. A summary for each section and subsection of the document may be generated as described herein in accordance with some embodiments, and may be displayed as a pop up text block 524 when a user provides an input, such as a click, a tap, or bring a cursor or a finger near a section or subsection shown on the outline.

In some embodiments, and by way of a non-limiting example, an outline may always be displayed partially on the top portion of the display, and content of the document 506 may be displayed partially on the bottom portion of the display.

As described herein in accordance with some embodiments, various sections and subsections may be identified based on parsing of the document, and displayed in a ToC format.

Figure 6:
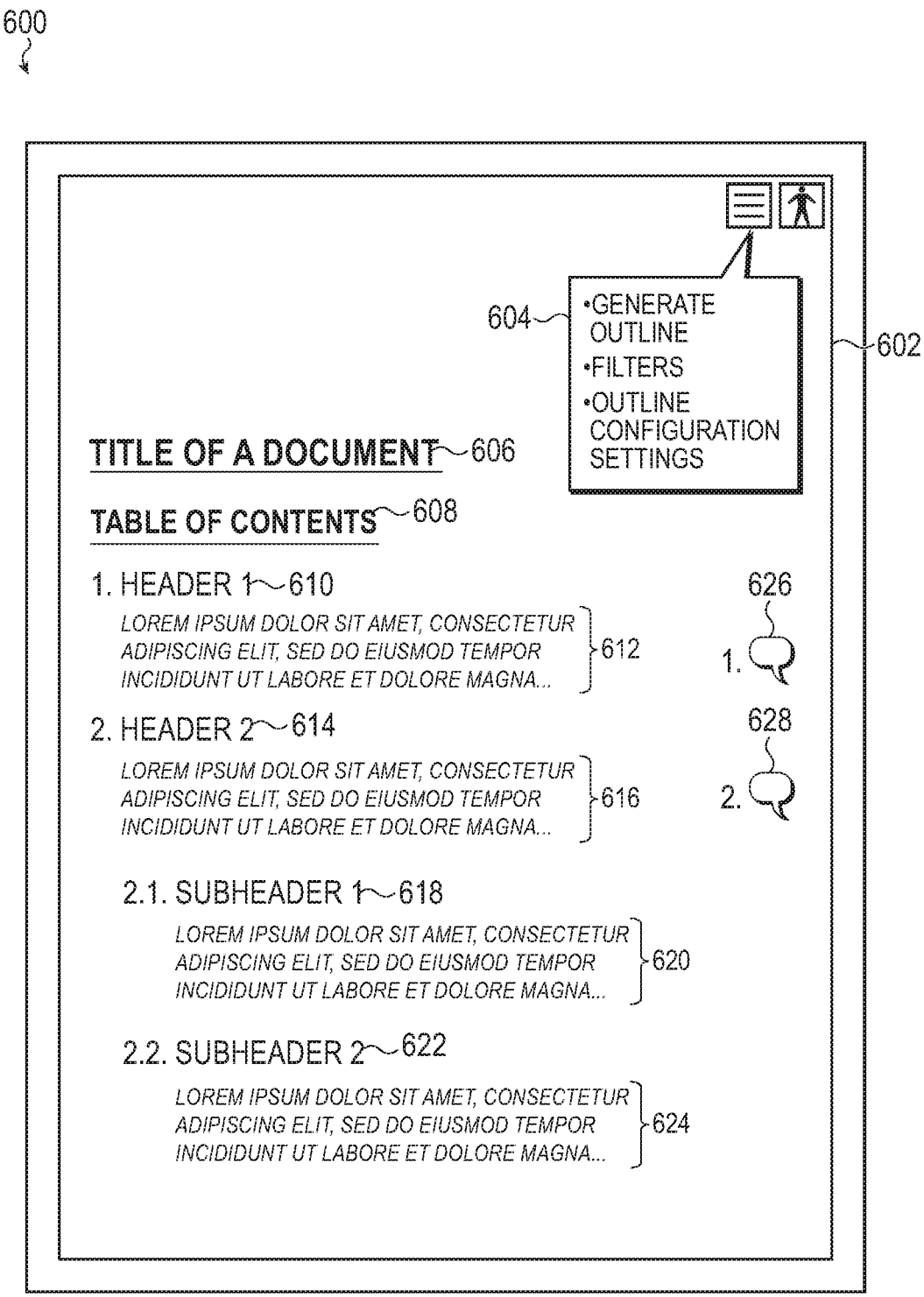
FIG. 6 is another example screen of the GUI of the client application of the document management system, as described herein.

FIG. 6 is another example screen of the GUI of the client application of the document management system, as described herein. As shown in an example GUI 600, an outline of a document may be displayed on a display 602 of a client device. The displayed outline may include a title of a document 606, and a table of contents (ToC) 608 of the document. One or more sections 610, 614 and/or one or more subsections 618, 622 of the document may also be shown in the ToC 608. A summary for each section, for example, 612, 616, 620, 624 may be generated, as described herein in accordance with some embodiments, and may be displayed in the ToC 608.

A menu option 604, described herein in accordance with some embodiments, may include, but is not limited to, options to generate an outline, one or more filter settings, and outline configuration settings. The one or more filters may enable the user to provide a specific search term or keywords identifying a particular user, product, technology, and so on, which may be of particular interest or relevance to the user. The outline configuration settings may enable the user to provide specific configuration information, including, but not limited to, a number of words, characters, and/or lines for a summary for each section and/or subsection, for the outline generation and display.

In some embodiments, the summary may also include one or more emojis or icons identifying statistics, or other type of conversations related to each section and subsection of the document. For example, for a header 610, there may be one comment from a user, and for a header 614, there may be four comments from one or more users. Icons 626 and 628 may be displayed on the generated outline as shown in 600. A native ID generated and associated with the icon 626 and the icon 628 may enable the user to jump to the corresponding comment section directly.

Figure 7A:
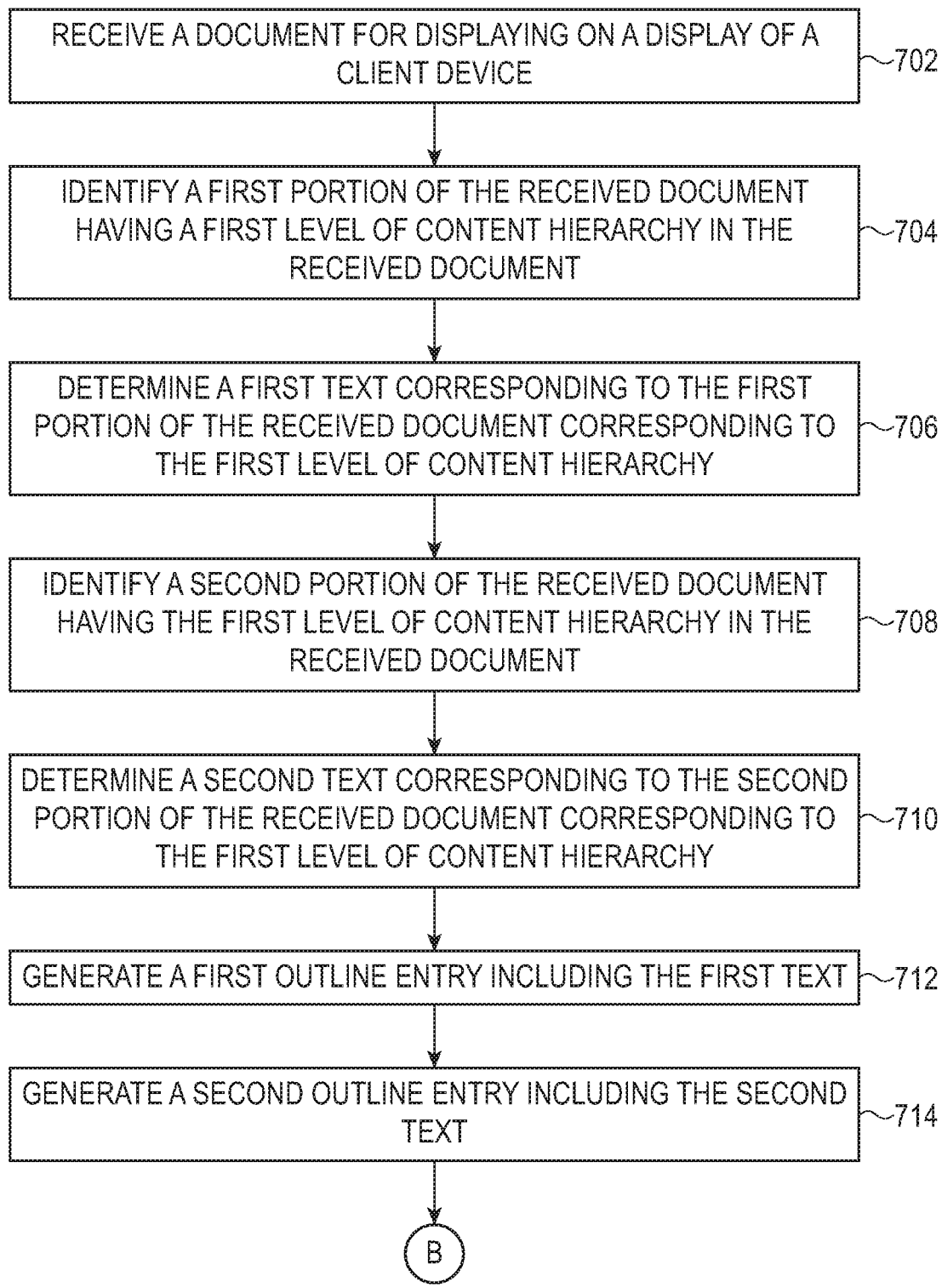
FIG. 7A and FIG. 7B each depicts a flow chart showing example operations of a method for generating an outline of a document of the document management system, as described herein.
Figure 7B:
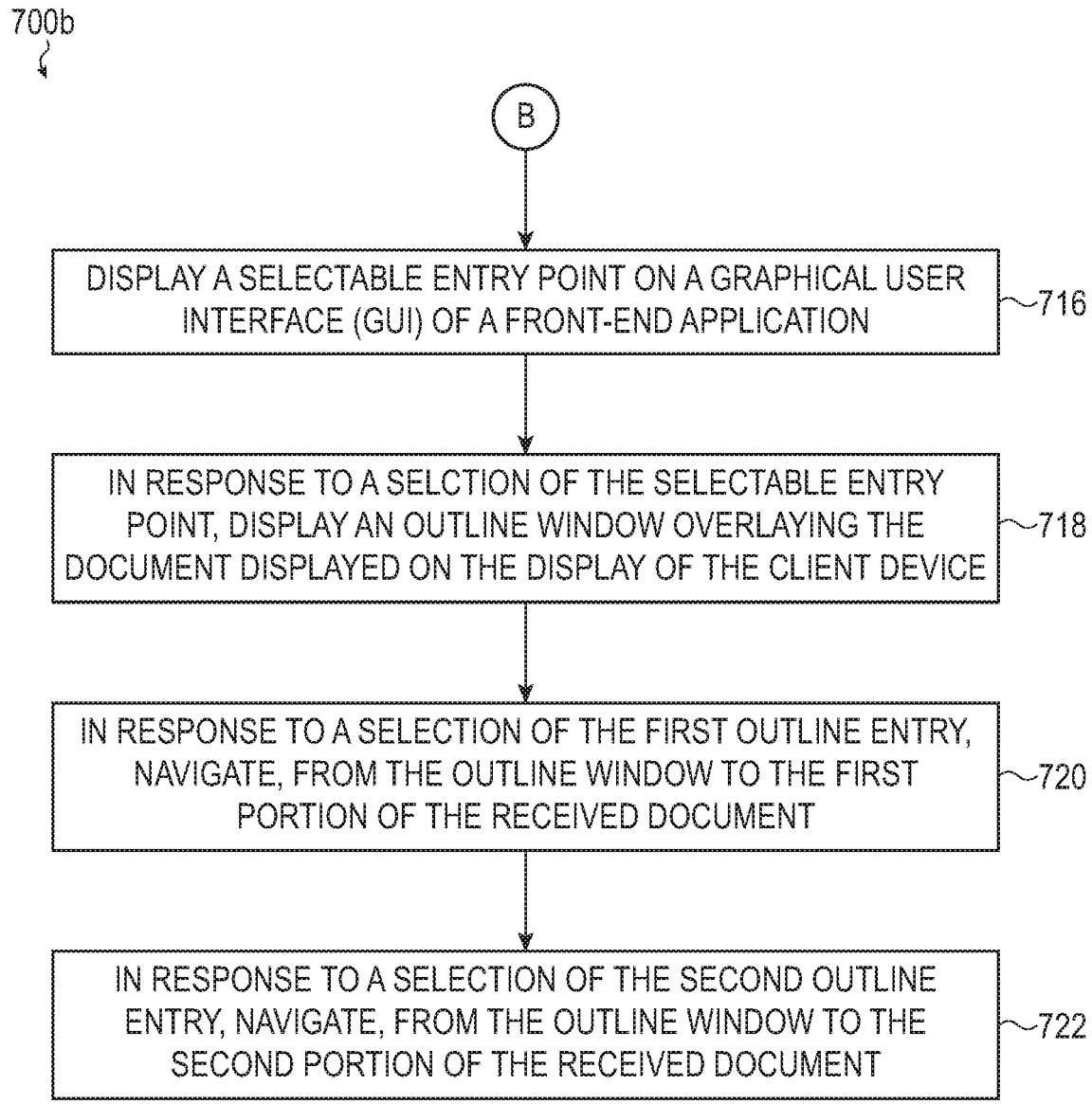

FIG. 7A and FIG. 7B each depicts a flow chart showing example operations of a method for generating an outline of a document of the document management system, as described herein. Flow charts 700a and 700b shown in FIG. 7A and FIG. 7B, respectively, illustrate operations performed for generating an outline of a document of the document management system. However, not all operations mentioned here may be required to be performed. The operations mentioned here may be performed in any order. In some instances, these operations are performed by the client device in response to a request to receive a document or page, or a request to view the document or page. In other implementations, one or more of the operations are performed by the backend system that is providing the document or page but are still triggered in response to the request to receive or view the document or page.

At 702, a document may be received at a client device from a server for displaying on a display of the client device. In some embodiments, and by way of a non-limiting example, the document may be received from the server based on a search request from a user. The document may be formatted for primary viewing on a non-mobile platform (e.g., a desktop platform). The document may include inherent formatting or structural elements and, as described herein, may also include tags, markup designations, or other content designation techniques.

At 704, a first portion of the received document having a first level of content hierarchy may be identified. At 708, a second portion of the received document having a first level of content hierarchy may be identified. The first portion or the second portion of the received document may be identified by parsing the received document using a parser that is adapted to identify a section header, distinct text, tags, document markup designations, or other properties of the content of the document or page. As described herein in accordance with some embodiments, the first level of content hierarchy or the second level of content hierarchy may be determined based on one or more of: an indent value, a font size, a font format, and so on.

At 706 and 710, a first text and a second text corresponding to the first portion and the second portion of the received document, respectively, may be determined. The first text and the second text each may be a summary of the first portion and the second portion respectively. The first text and the second text may be determined by extracting a portion of the text located within a region associated with the particular level of hierarchy. In some cases, the first text and the second text may be determined using one or more machine-learning algorithms or natural language processing algorithms. The first text and/or the second text may be determined based on analyzing content of the first portion and/or the second portion, respectively, using a tokenization technique used to extract key words, which may be used to construct the entry text to be displayed in the outline.

At 712 and 714, a first outline entry and a second outline entry, respectively, may be generated. The first outline entry may include the first text and the second outline entry may include the second text. The first text and the second text, as described herein, may include a summary of the content associated with the first portion and the second portion, respectively. The first outline entry and the second outline entry may also include a native ID corresponding to the first portion and the second portion, respectively, as described herein.

In some embodiments, and by way of a non-limiting example, the first outline entry or the second outline entry may be generated by parsing the received document according to one or more of: a profile of a user, a role of a user in an organization, a summary size limit for the summary, and one or more filter keywords specified by a user.

At 716, a selectable entry point, referred to herein as a menu option, is displayed on a graphical user interface (GUI) of a front-end application or a client application executing on the client device. At 718, in response to a selection of the selectable entry point, for example, using a click or tap, and so on, an outline window overlaying the document may be displayed on the display of the client device. The outline window may include the first outline entry and the second outline entry. In other words, the outline window may display the first outline entry including the first text, which may be a summary of the content corresponding to the first portion of the document, and the second outline entry including the second text, which may be a summary of the content corresponding to the second portion of the document. The user thus may review the document and its various sections by going through the outline.

At 720, in response to a selection of the first outline entry, for example, using a click or tap, and so on, the user may be navigated to the first portion of the received document and the outline may be closed. However, as described herein, the user may access the outline any time by clicking or interacting with the menu option.

At 722, in response to a selection of the second outline entry, for example, using a click or tap, and so on, the user may be navigated to the second portion of the received document and the outline may be closed. However, as described herein, the user may access the outline any time by clicking or interacting with the menu option In some embodiments, and by way of a non-limiting example, the first text and/or the second text may be automatically displayed on the display of the client device in response to a user navigating to the first outline entry and/or the second outline entry, respectively, in the displayed outline window.

In some embodiments, and by way of a non-limiting example, the first text and/or the second text may be automatically hidden from being displayed on the display of the client device in response to a user navigating away from the first outline entry and/or the second outline entry, respectively, in the displayed outline window.

In some embodiments, and by way of a non-limiting example, a sub-portion having a second level of content hierarchy for the identified first portion or the second portion in the received document may be determined based on one or more of: an indent value, a font size, and a font type, and so on. In response to determining that the first portion or the second portion of the document includes the sub-portion having the second level of content hierarchy, a third outline entry corresponding to the sub-portion may be generated. The third outline entry may be similar to the first outline entry or the second outline entry. In other words, like the first outline entry or the second outline entry, the third outline entry may include a third text that is determined, like the first text or the second text, based on analysis of content of the sub-portion using a machine-learning algorithm or a natural language processing algorithm.

In some embodiments, and by way of a non-limiting example, the first text, the second text, and/or the third text may be determined based on an input or feedback received from at least one user of a number of users. The first text, the second text, and/or the third text may include an icon (a unique navigation ID) for a user to directly navigate to the input or the feedback received from the at least one user of a number of users.

Overall, various embodiments, as described herein, may enable the user to review the document more efficiently.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method of generating a navigation interface for a document, the method comprising:
    sending, from a client device, a request to access a document, the document comprising document content;
    subsequent to receiving the requested document at the client device, instantiating an outline-generation service executing locally in conjunction with a mobile browser on the client device, the outline-generation service configured to:
        generate a set of document IDs corresponding to respective portions of a document, at least one document ID of the set of document IDs different from a native ID of the document and the at least one document ID designating a location of a respective portion of the document that is unique to the at least one document ID; and
        generate a set of outline entries, each outline entry including a portion of the document content associated with a respective document ID of the set of document IDs;
    cause display of the document content on the display of the client device;
    in response to a user selection of a selectable entry point within the mobile browser, cause display of a generated outline overlaying a least a portion of the document content, the selectable entry point accessible independent of a scroll position of the requested document displayed by the client device, the generated outline including the set of outline entries;
    in response to a selection of a first outline entry of the set of outline entries, cease display of the generated outline and automatically cause the document to scroll to a location within the document, the location determined using the at least one document ID generated locally by the outline-generation service; and
    in response to receiving from a server an update to the requested document, regenerating, by the outline-generation service running locally on the client device, the at least one document ID to designate an updated location of the respective portion of the document based on the update to the requested document.

2. The method of claim 1, wherein:
    the outline-generation service is a serialized parsing macro stored locally on the client device and defined, at least in part, by user input provided to the client device;
    each document ID of the set of document IDs is associated with a respective location in the document, each respective location different for each document ID;
    each outline entry of the set of outline entries includes native graphical elements associated with respective portions of the document; and
    in response to a selection of a second outline entry of the set of outline entries, cause navigation to a respective portion of the document associated with a second document ID of the set of document IDs.

3. The method of claim 1, wherein the generated outline of the document is generated according to one or more of: a profile of a user, a role of the user in an organization, a summary size limit for a summary, and one or more filter keywords specified by the user.

4. The method of claim 1, further comprising:
    determine whether a first portion of the document content includes a sub-portion having a second level of content hierarchy, the second level of content hierarchy determined based on one or more of: an indent value, a font size, and a font type; and
    in response to determining that the first portion of the document includes the sub-portion having the second level of content hierarchy, update a first outline entry to further include the sub-portion of the first portion.

5. The method of claim 1, wherein outline content is determined based on an input or feedback received from at least one user of a plurality of users.

6. The method of claim 1, further comprising:
    in response to an automatic request at a preconfigured time, receive an update to the document; and
    in response to receiving the update to the document, regenerate the generated outline of the document in accordance with the updated document.

7. The method of claim 1, wherein the first outline entry of the generated outline is determined based on analyzing content of a first portion of the document content using a machine-learning algorithm.

8. A method of overlaying a navigational tool over an electronic document displayed in a mobile browser with limited display space, the method comprising:

requesting, from a client device, a document, the document comprising document content and native document IDs associated with the document content;

subsequent to receiving the document and in response the document being executed on a mobile browser of a client device, executing an outline-creation service, the outline-creation service executing locally in conjunction with the mobile browser on the client device, the outline-creation service configured to:

for a first portion of the document content, generate a first document ID based at least in part on the first portion of the document content, the first document ID different from the native document IDs and the first document ID designating a location of the first portion of the document that is unique to the first document ID;

generate a first outline entry using the first portion of the document content associated with the first document ID;

for a second portion of the document content, generate a second document ID based at least in part on the second portion of the document content, the second document ID different from the native document IDs associated with the document content as received and the second document ID designating a location of the second portion of the document that is unique to the second document ID;

generate a second outline entry using the second portion of the document content associated with the second document ID;

causing display, at the client device, of the document content and a selectable entry point on a graphical user interface of a front-end application;

in response to a selection of the selectable entry point within the mobile browser, cause display, at the client device, of a generated outline overlaying the document content, the selectable entry point accessible independent of a scroll position of the document displayed by the client device, the generated outline including the first and the second outline entries;

in response to a selection of the first outline content entry, cease display of the generated outline, use the first document ID to determine the location of the first portion of the document corresponding to the first outline content entry and automatically scroll the document to the first portion of the document content; and in response to receiving from a server an update to the document, regenerating, by the outline-creation service running locally on the client device, the first document ID to designate an updated location of the first content portion based on the update to the document.

9. The method of claim 8, wherein the first outline entry or the second outline entry is generated according to one or more of: a profile of a user, a role of the user in an organization, a summary size limit for a summary, and one or more filter keywords specified by the user.

10. The method of claim 8, further comprising:
determining whether the first portion of the document content includes a sub-portion having a second level of content hierarchy in the document, the second level of content hierarchy determined based on one or more of: an indent value, a font size, and a font type; and in response to determining that the first portion of the document content includes the sub-portion having the second level of content hierarchy:

generating a third document ID associated with the sub-portion of the first portion of the document, the document ID distinct from the native document ID; and generating a third outline entry including the sub-portion of the first portion of the document content.

11. The method of claim 10, wherein the first outline entry, the second entry, or the third outline entry is determined based on analysis of content of the first portion, the second portion, or the sub-portion, respectively, using a machine-learning algorithm.

12. The method of claim 8, further comprising:
in response to an automatic request at a preconfigured time, receive an update to the document; and
in response to receiving the update to the document:
regenerate the first outline entry using the first portion of the updated document content; and
regenerate the second outline entry using the second portion of the updated document content.

13. The method of claim 8, wherein the outline-creation service is a serialized parsing macro stored locally on the client device and defined, at least in part, by user input provided to the client device.

14. The method of claim 8, wherein the generated outline further includes content of the document partially displayed on a bottom portion of the display.

15. A method of displaying a user-specific outline, the method comprising:

sending, from a client device, a request to display a document, the document comprising document content and native IDs associated with portions of the document content;

in response to the document content being executed on a mobile browser of a client device, instantiating an instance of an outline-creation service executing locally in conjunction with the mobile browser on the client device, the outline-creating service configured to:

parse the document to identify one or more properties including: a section header, distinct text tags, or document markup designations;

for a first portion of the document content, generate a first document ID based at least in part on the first portion of the document content and the one or more properties, the first document ID different from the native IDs and the first document ID designating a location of the first portion of the document content that is unique to the first document ID; and generate a first outline entry using the first portion of the document content, the first outline entry including first native graphical elements of the first portion of the document content; and causing display, at the client device, of the document content and a selectable entry point on a graphical user interface of a front-end application, the selectable entry point accessible independent of a scroll position of the document displayed by the client device;

in response to a selection of the selectable entry point, display, at the client device, a generated outline overlaying the document content and including the first outline entry;

in response to a selection of the first outline entry, cease display of the generated outline, use the first document ID to determine the location of the first portion of the document content corresponding to the first outline content entry and automatically display the first portion of the document; and in response to receiving from a server an update to the document, regenerating, by the outline-creating service running locally on the client device, the first document ID to designate an updated location of the first content portion based on the update to the document.

16. The method of claim 15, wherein the first portion of the document has a first level of content hierarchy, and further comprising:

extracting a first text from the first portion of the document corresponding to the first level of content hierarchy;

generating the first outline entry using the first text;

identifying a second portion of the document having the first level of content hierarchy;

extracting a second text from the second portion of the document corresponding to the first level content hierarchy; and generating a second outline entry using the second text.

17. The method of claim 16, wherein the first text and the second text are extracted using a natural language processing algorithm.

18. The method of claim 16, wherein the generated outline includes a summary of the first content portion.

19. The method of claim 18, wherein the first outline entry is generated by parsing the document according to one or more of: a profile of a user, a role of a user in an organization, a summary size limit for the summary, and one or more filter keywords specified by a user.

20. The method of claim 15, further comprising:

authenticating user access to the document; and in accordance with the user failing authentication for the first portion of the document, suppressing display of the first portion of the document.

* * * * *